United States Patent Office 3,230,267
Patented Jan. 18, 1966

3,230,267
DIHALOMETHYL AROMATICS
Ellis K. Fields, Chicago, Ill., assignor to Standard Oil Company, Chicago, Ill., a corporation of Indiana
No Drawing. Filed Mar. 20, 1962, Ser. No. 181,196
8 Claims. (Cl. 260—649)

This invention relates to aromatic compounds containing a dihalomethyl group and to a method of preparing them. More particularly, this invention pertains to a certain class of aromatic compounds containing a dihalomethyl substituent attached to a nuclear substituent which is alkyl in nature and which in turn is attached to an aromatic ring.

Although carbene or methylene: $>CH_2$ is sufficiently reactive to be inserted in any hydrocarbon, dihalocarbenes have not been reported as attacking a carbon-hydrogen bond. In fact, W. Kirmse, Angew. Chem., 73, 161 (1961), states that halogen-substituted carbenes do not attack C—H groups.

I have discovered that dihalocarbenes insert dihalomethyl groups in nuclear substituents alkyl in nature on aromatic rings. The resulting dihalomethyl and especially the dichloromethyl derivatives of said aromatic compounds are useful as chemical intermediates. The dichloromethyl derivatives are useful as extreme pressure additives for lubricants. The dihalomethyl compounds and their preparation with which this invention is concerned are derived from the reaction of an aromatic compound having a nuclear substituent alkyl in nature with a dihalocarbene at a temperature of from 25 to 150° C.

The aromatic reactant preferably contains at least one benzylic hydrogen atom, that is, contains directly attached to an aromatic ring such as phenyl, naphthyl, phenanthryl, anthracyl, and the like,

Such benzylic hydrogen atoms are present in methyl substituents, ethyl substituents, the hydrogen on the tertiary carbon of an isopropyl substituent, a hydrogen in a 2-butyl substituent, the saturated ring of tetralin, the saturated ring of spiro(cyclohexane-1,1'-indene) and others. The aromatic rings of the aromatic reactant may also contain such substituents as halogen, alkyl hydrocarbon, aryl hydrocarbon, alkoxy and alkylthio groups. Illustrative of the aromatic reactants are cumene, diisopropyl benzene, cymenes, diphenylmethane, 4-chlorocumene, 3-bromotoluene, tetralin, 4-ethyl diphenyl, p-isopropyl anisole, the 3-methoxy derivative of thymol, the 3-methoxy derivative of menthol, isopropyl naphthalenes, methyl naphthalenes, isopropyl phenanthrenes, isopropyl anthracenes, and the like.

Of the dihalocarbenes, dichlorocarbene and dibromocarbene are preferred as reactants for the proces of this invention. These reactants may be formed in any of the ways known to those skilled in the art, for example, they may be formed by the reaction of potassium t-butoxide or sodium methylate with chloroform and bromoform respectively or by the reaction of sodium methylate with ethyl trichloro- or tribromoacetates respectively or by the pyrolysis of sodium trichloro- or tribromoacetates respectively.

Thus, from cumene there may be prepared beta, beta-dichloro-tertiary-butylbenzene; from cymenes there may be prepared methyl-beta, beta-dichloro-tertiary butylbenzenes; from diisopropyl benzenes there may be prepared isopropyl-beta,beta-dichloro-tertiary butylbenzenes; from diphenyl methane there may be prepared 1,1-diphenyl-2,2-dichloro-ethane; from 2-phenylbutane there may be prepared 2-phenyl-2-dichloro-methyl butane; from 4-chlorocumene there may be prepared p-chloro-beta,beta-dichloro-tertiary-butylbenzene; from ethylbenzene there may be prepared 2,2-dichloro-isopropylbenzene; from 4-ethyldiphenyl there may be prepared 2,2-dichloroisopropyl diphenyl; from p-isopropyl anisole there may be prepared p-(beta,beta-dichloro-tertiary-butyl) anisole; and from m-methylthiocumene there may be prepared m-methylthio-beta,beta-dichloro-tertiary butylbenzene and the like by reacting in situ dichlorocarbene with the appropriate aromatic compound. The corresponding dibromomethyl derivatives may, of course, be prepared by employing in situ dibromocarbene.

In general, the reaction is carried out by stirring the aromatic reactant with the precursors of dichloro- or dibromocarbene at a reaction temperature of 25 to 150° C. When sodium trichloroacetate or sodium tribromoacetate are resources of the dihalocarbene reactant, a mole ratio of from 20:1 to 1:1, desirably from 2 to 3:1 based on the aromatic reactant is employed, that is, the aromatic reactant is employed in the range of equimolecular proportions to proportions in excess thereof up to 20 moles per mole of dihalocarbene. The reaction is carried out until the evolution of carbon dioxide ceases. A reaction period of from 0.5 to 24 hours may be employed and in many cases a reaction time of only from 2 to 3 hours will suffice. A reaction solvent may be employed thereof, preferably an excess of the aromatic reactant functions as the solvent. The addition of small amounts of 1,2-dimethoxy ethane or diglyme (diethylene glycol dimethyl ether) in the range of 2 to 15% by volume of the aromatic reactant enhances reaction. All reactants should be anhydrous, otherwise the yields of the desired products are reduced.

For a clearer understanding of this invention, the following illustrative examples are given.

*Example 1*

A mixture of 1131.2 ml. (8 moles) cumene, 556.7 g. (3 moles) sodium trichloroacetate, and 75 ml. 1,2-dimethoxyethane is stirred and refluxed till no more $CO_2$ evolves (12 hours). The mixture is filtered, the sodium chloride washed with hexane, and the combined filtrate and hexane washings are distilled. Cumene 750.8 g. (6.3 moles) is recovered, then beta,beta-dichloro-t-butylbenzene distills at 68–70° C. and 3 mm. A total of 199 g. (0.98 mole) is obtained, $n_D^{20}$ of 1.5400. This is a 33% yield based on sodium trichloroacetate, 58% based on cumene.

Analysis:

|  | Calculated ($C_{10}H_{12}Cl_2$) | Found |
|---|---|---|
| Carbon | 59.0 | 58.8 |
| Hydrogen | 5.9 | 5.7 |
| Chlorine | 35.0 | 35.3 |

Nuclear magnetic resonance clearly proves the structure:

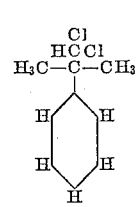

run neat, with hexamethyl siloxane as 0, the 6 methyl hydrogens give a sharp peak at 54.3 cycles/sec., the lone H of the dichloromethyl group peaks at 228.7 cycles/sec., and the 5 hydrogens on the benzene ring peak at 285.4 cycles/sec. Mass spectrometric analysis is wholly consistent with the proposed structure, beta,betadichloro-t-butylbenzene. The infra-red absorption spectrum is similar to that of t-butylbenzene; it has strong bands at 10.5, 11.7, 12.9 and 13.8 that are not present in t-butylbenzene.

*Example 2*

A mixture of 141.4 ml. (1.0 mole) cumene and 56 g. (0.5 mole) potassium t-butoxide is stirred and a solution 80.1 ml. (1 mole) chloroform in 60 ml. cumene was added over one hour with cooling to keep the temperature below 50° C. The mixture is stirred an additional hour at 50° C., filtered and distilled giving 1 g. impure beta,-beta-dichloro-t-butylbenzene (0.5%), identified by its IR spectrum.

*Example 3*

A mixture of 141.4 ml. (1 mole) cumene and 27 g. (0.5 mole) sodium methylate was stirred at 5° C. and 69.2 g. (0.5 mole) ethyl trichloroacetate was added dropwise over a half hour. The mixture is stirred at 25° C. for 16 hours, poured into water, 100 ml. hexane is added, the organic layer is dried and distilled; a fraction boiling at 0.45 mm. Hg and 64–65° C., is identified as beta,beta-dichloro-t-butylbenzene by its IR spectrum.

*Example 4*

A mixture of 272 ml. (2 moles) tetralin, 185.4 g. (1 mole) sodium trichloroacetate, and 25 ml. 1,2-dimethoxyethane is stirred at 130° C. till no more $CO_2$ evolves, 3.5 hours. It is filtered, the sodium chloride is washed with hexane, and the combined filtrate and washings are distilled. Tetralin, 214 ml., is recovered at 44–50° C. and 0.6 mm. Hg alpha-dichloromethyl tetralin boils at 110–111° C. and 0.9 mm. Hg $n_D^{20}$ of 1.5648; the yield is 55.5 g., 39% based on sodium trichloroacetate, 60% based on tetralin.

Analysis:

| | Calculated ($C_{11}H_{12}Cl_2$) | Found |
|---|---|---|
| Carbon | 61.4 | 61.1 |
| Hydrogen | 5.6 | 5.3 |
| Chlorine | 33.0 | 33.3 |

The nuclear magnetic and mass spectra were wholly consistent with the structure:

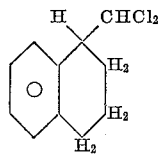

*Example 5*

A mixture of 162 g. (1 mole) p-diisopropylbenzene, 185.4 g. (1 mole) sodium trichloroacetate, and 18 ml. 1,2-dimethoxyethane is stirred at 138° C. for 40 hours, cooled, filtered and distilled. There is recovered 102 g. p-diisopropylbenzene, boiling at 2.7 mm. Hg and 62–67° C., and 59.3 g. pi-isopropyl beta,beta-dichloro-t-butylbenzene boiling at 0.6 mm. Hg and 98° C., $n_D^{20}$ of 1.5285. The yield is 24% based on sodium trichloroacetate and 65% based on p-diisopropylbenzene.

Analysis:

| | Calculated ($C_{13}H_{18}Cl_2$) | Found |
|---|---|---|
| Carbon | 63.6 | 63.0 |
| Hydrogen | 7.3 | 6.9 |
| Chlorine | 29.0 | 29.7 |

The nuclear magnetic and mass spectrum show that the structure is

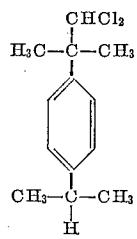

although there are some slight impurities present.

*Example 6*

A mixture of 336.5 g. (2 moles) diphenylmethane, 185.4 g. sodium trichloroacetate and 25 ml. 1,2-dimethoxyethane was stirred at 135–140° C. for 5 hours, filtered and distilled. Diphenylmethane, 297 g., is recovered, boiling at 0.3 mm. Hg and 76–85° C. The chlorine-containing product, 10 g. (17% yield based on diphenylmethane) boiled at 120–125° C. and 0.5 min., and solidified. It is washed with cold pentane and dried, giving white plates melting at 78–79° C.

Analysis:

| | Calculated ($C_{14}H_{12}Cl_2$) | Found |
|---|---|---|
| Carbon | 66.9 | 66.7 |
| Hydrogen | 4.8 | 4.6 |
| Chlorine | 28.3 | 28.5 |

Delacre, Bl. (3) 13, 859, made this same compound, $(C_6H_5)_2$—CH—$CHl_2$ by condensation of dichloroacetaldehyde with benzene, using aluminum chloride as catalyst. His melting point was 80° C.

Almen tests were conducted on these dichlorocarbene insertion products as extreme pressure additives at 2% concentrations by weight in solvent-extracted 5-W oil.

| Additive | Pass, lb. | Fail, lb. |
|---|---|---|
| None | 4 | 6 |
| Product, Example 1 | 18 | 20 |
| Product, Example 4 | 20 | 22 |
| Product, Example 5 | 18 | 20 |

In addition to being extreme pressure additives as hereinbefore demonstrated, the compounds made according to the process of this invention as well as the new compounds hereinbefore disclosed and characterized, can be employed as reactants to prepare other chemical compounds.

What is claimed is:

1. A method for the introduction of a dihalomethyl group selected from the class consisting of dichloromethyl and dibromoethyl in a nuclear alkyl substitutent on an aromatic compound selected from the class consisting of aromatic hydrocarbons and substituted aromatic hydrocarbons wherein the substituent is selected from the group consisting of halogen, alkyl hydrocarbon, aryl hydrocarbon, alkoxy and alkyl thio, wherein said nuclear alkyl substituent has at least one hydrogen on the carbon directly attached to the aromatic ring carbon which method comprises reacting said nuclear alkyl substituted aromatic compound under anhydrous conditions at a temperature in the range of from 25 to 150° C. with a dihalocarbene precusor selected from the class consisting of sodium trichloroacetate, sodium tribromoacetate, sodium methylate and chloroform, sodium methylate and bromoform, sodium methylate and ethyl trichloroacetate, sodium methylate and ethyl tribromoacetate, potassium t.-butoxide and chloroform, and potassium t.-butoxide and bromoform.

2. The method of claim 1 wherein said aromatic compound reactant is a nuclear alkyl hydrocarbon substituted aromatic hydrocarbon.

3. A method for introducing a dichloromethyl group on the methylene carbon atom bridging two aromatic rings in a diaryl methane having at least one hydrogen on said methylene carbon atom which comprises reacting under anhydrous conditions said diarylmethane with dichlorocarbene sodium trichloroacetate at a temperature in the range of 135 to 140° C.

4. A method for preparing a beta,beta-dichloro-tertiary-butyl substituted aromatic compound which comprises reacting under anhydrous conditions an aromatic compound containing a nuclear isopropyl substituent with dichlorocarbene from sodium trichloroacetate at a temperature in the range of 25 to 150° C.

5. A method for preparing beta,beta-dichloro-tertiary-butyl-benzene which comprises reacting under anhydrous conditions cumene which dichlorocarbene from sodium trichloroacetate at a temperature in the range of from 25 to 150° C.

6. A method for preparing an isopropyl beta,beta-dichlorotertiary-butylbenzene which comprises reacting under anhydrous conditions diisoprophylbenzene with dichlorocarbene formed sodium trichloroacetate at a temperature of 138° C.

7. A method for preparing alpha-dichloromethyl tetralin which comprises reacting under anhydrous conditions tetralin with dichlorocarbene from sodium trichloroacetate at a temperature in the range of 25 to 150° C.

8. The compound p-isopropyl, beta,beta-dichloro-tertiarybutylbenzene boiling at 98° C. and 0.6 mm. Hg, having the refractive index $n_D^{20}$ of 1.5285 and having the formula

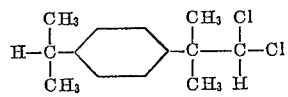

References Cited by the Examiner
UNITED STATES PATENTS

| | | | |
|---|---|---|---|
| 3,046,314 | 7/1962 | Mields et al. | 260—649 |
| 3,095,455 | 6/1963 | Marco et al. | 260—651 |

FOREIGN PATENTS 448,851  6/1936  Great Britain.

OTHER REFERENCES

Chemical Abstracts, 41, 5113 (1947).
Hine et al., J.A.C.S., 81, 6446–9 (1959).
Huntress, Organic Chlorine Compounds, John Wiley & Sons, Inc., London (1948), p. 1213.
Kirmse, Angew. Chem., 73, 161–166 (1961).
Rentov et al., "Akad. Nank USSR, Dohlady," vol. 139 (1961).
Wagner, Proc. Chem., Soc. (1959), p. 229.

LEON ZITVER, *Primary Examiner.*